10 Sheets--Sheet 1.
G. McKAY & R. H. MATHIES.
Sewing-Machine.
No. 6,535. Reissued July 6, 1875.
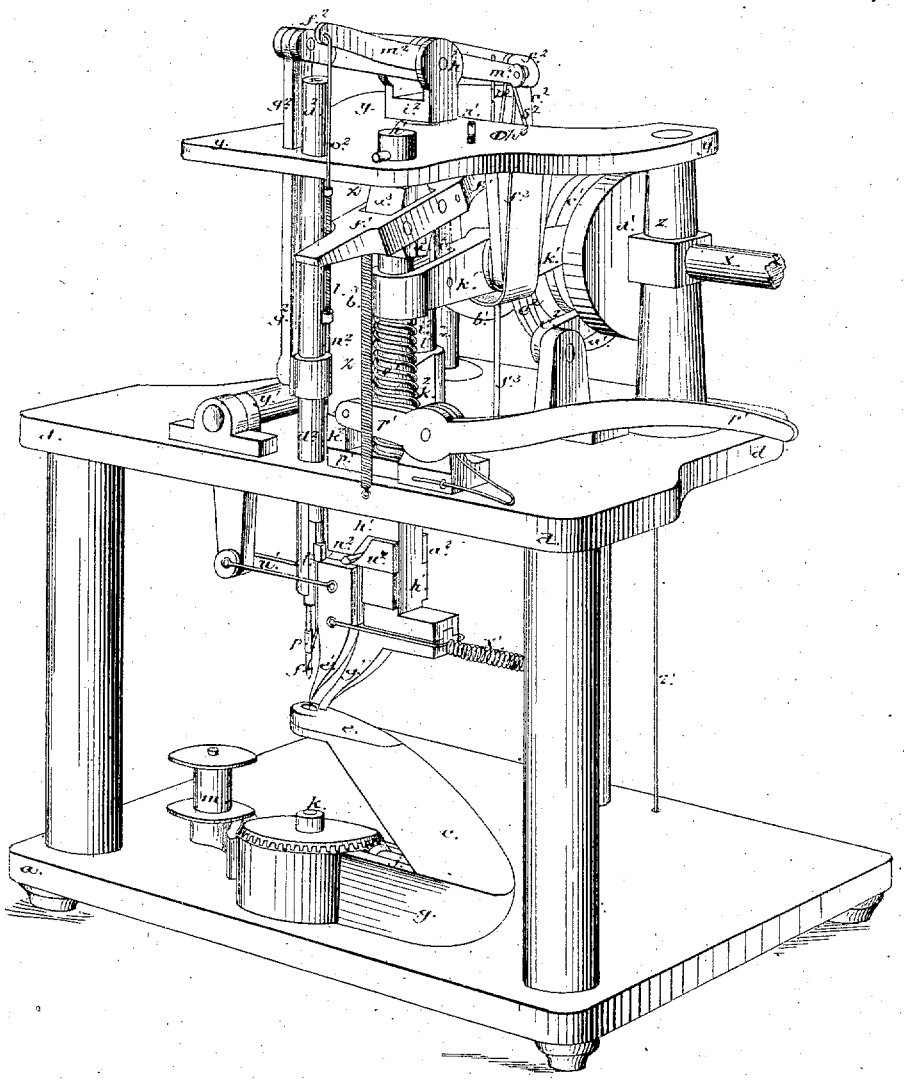
Witnesses:
A. A. Lenhman
Edw. W. Down.
Inventors
Gordon McKay, Trustee McKay Sewing Machine Association
Amos F. Gordon McKay & Robert H. Mathies
per Crosby & Gregory Attys
THE NORRIS PETERS CO., WASHINGTON, D. C.

10 Sheets--Sheet 2.
G. McKAY & R. H. MATHIES.
Sewing-Machine.
No. 6,535. Reissued July 6, 1875.
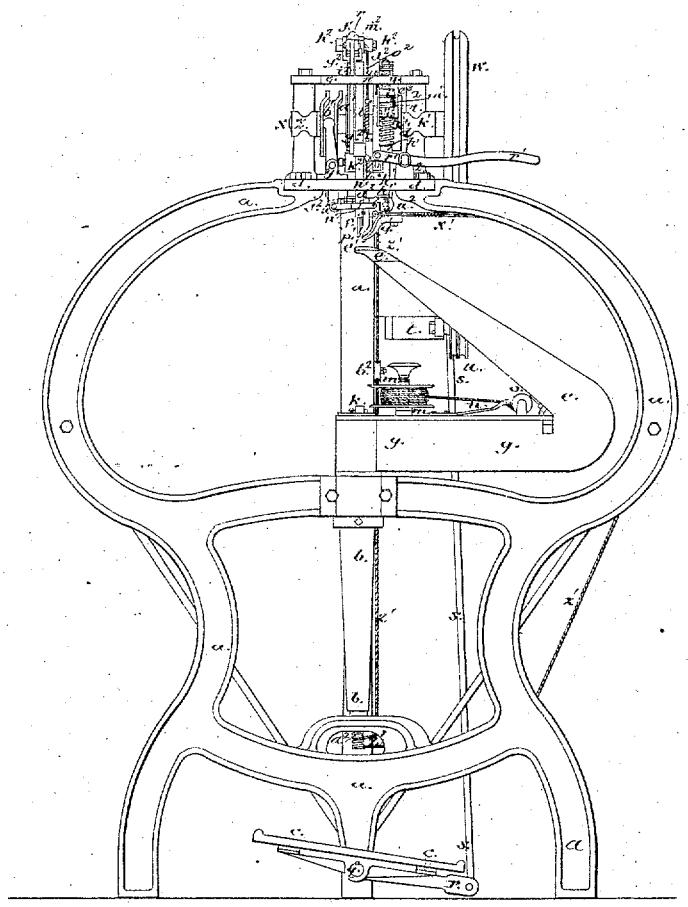
Witnesses:
A. A. Seaholm
Edw. W. Dunn
Inventors:
Gordon McKay
Trustee McKay Sewing Machine Association
Assns. Gordon McKay & Robert H. Mathies
per Crosby & Gregory Attys
THE NORRIS PETERS CO., WASHINGTON, D. C.

10 Sheets--Sheet 3.
G. McKAY & R. H. MATHIES.
Sewing-Machine.
No. 6,535. Reissued July 6, 1875.
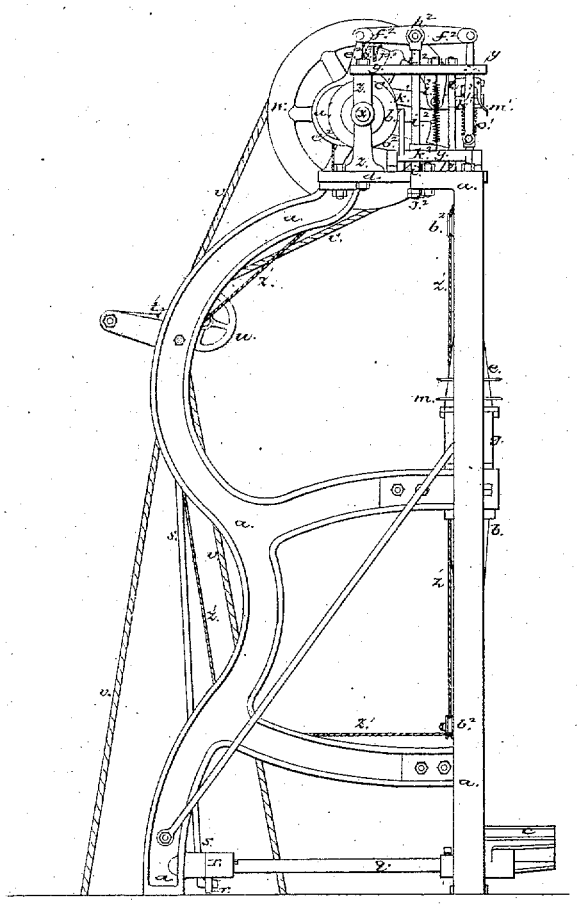
Witnesses:
A. A. Seaman
Edw. W. Down
Inventors:
Gordon McKay
Trustee McKay Sewing Machine Association
Assnr. Gordon McKay & Robert H. Mathies
per Crosby & Gregory Attys
THE NORRIS PETERS CO., WASHINGTON, D. C.

10 Sheets--Sheet 4.
G. McKAY & R. H. MATHIES.
Sewing-Machine.
No. 6,535. Reissued July 6, 1875.
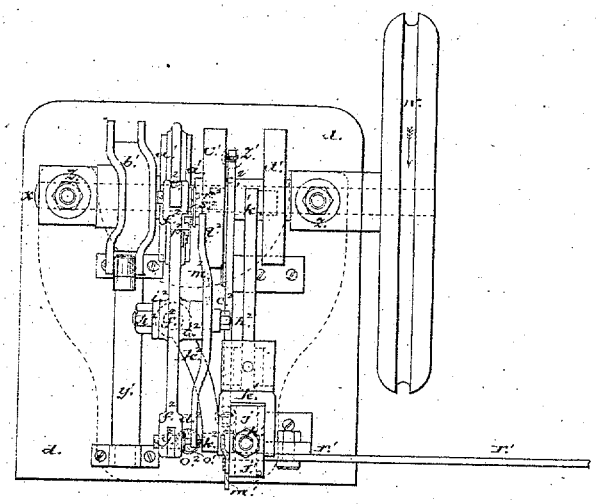
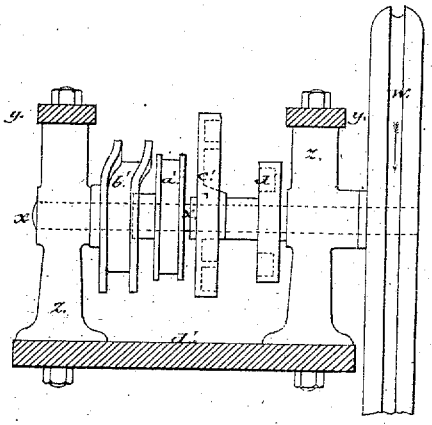
Witnesses:
A. A. Seaman
Edw. W. Donn
Inventors:
Gordon McKay
Justin McKay Sewing Machine Association
Assees Gordon McKay & Robert H. Mathies
per Leverett & Gregory Attys
THE NORRIS PETERS CO., WASHINGTON, D. C.

G. McKAY & R. H. MATHIES.
Sewing-Machine.
No. 6,535. Reissued July 6, 1875.
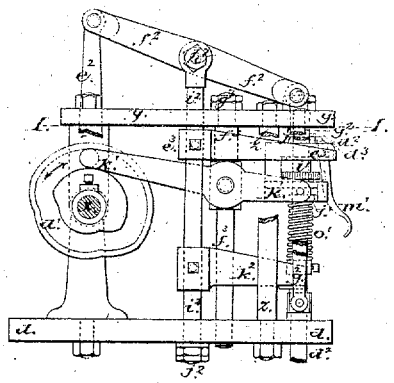
Plan Sect on line 1. 1.
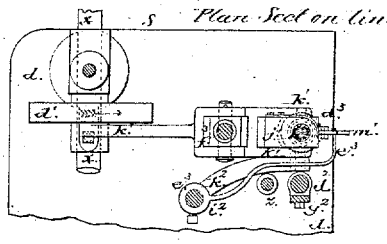
Diagrams of Motions
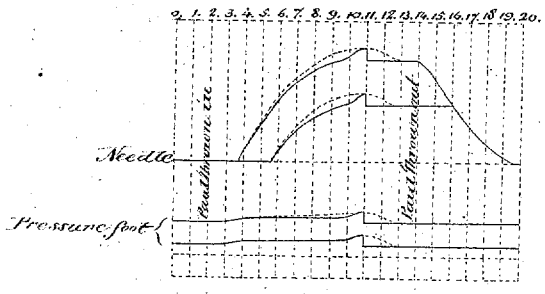
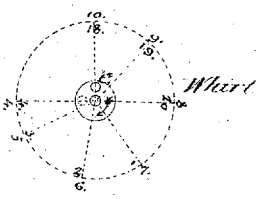
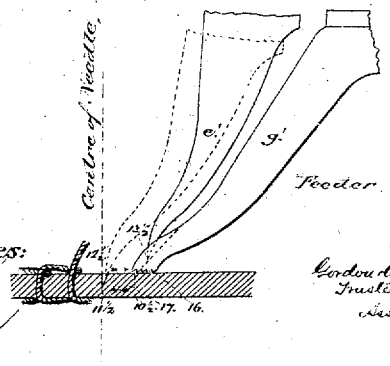
Witnesses:
A. A. Seetman
Edw. W. Down
Inventors
Gordon McKay
Trustee McKay Sewing Machine Association
Assees Gordon McKay & Robert H. Mathies
per Lemuel Gregory
Atty.
THE NORRIS PETERS CO., WASHINGTON, D. C.

G. McKAY & R. H. MATHIES.
Sewing-Machine.
No. 6,535
Reissued July 6, 1875.
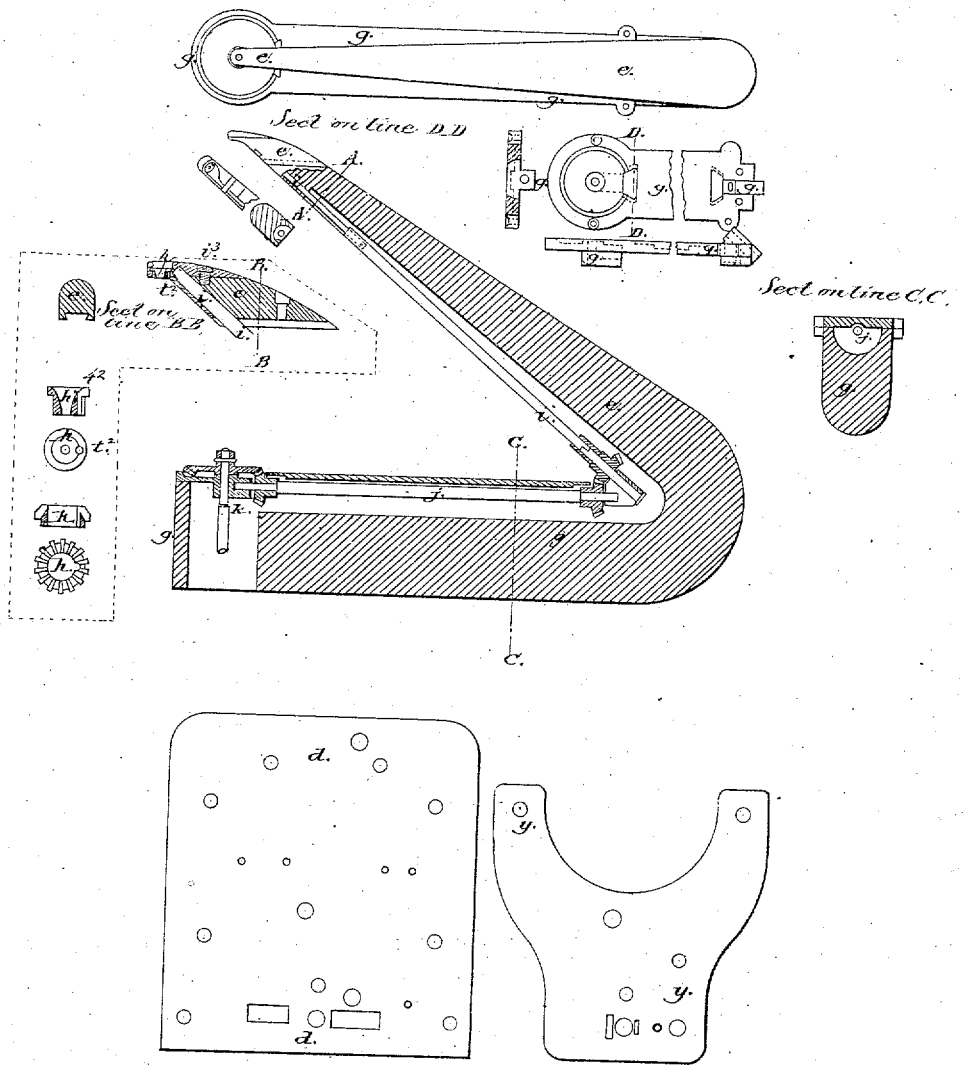
Witnesses:
A. A. Leetman
Edw. W. Donn
Inventors:
Gordon McKay
Trustee McKay Sewing Machine Association
Assrs Gordon McKay & Robert H. Mathies
per Crosby & Gregory
Attys
THE NORRIS PETERS CO., WASHINGTON, D. C.

10 Sheets--Sheet 7.
G. McKAY & R. H. MATHIES.
Sewing-Machine.
No. 6,535. Reissued July 6, 1875.
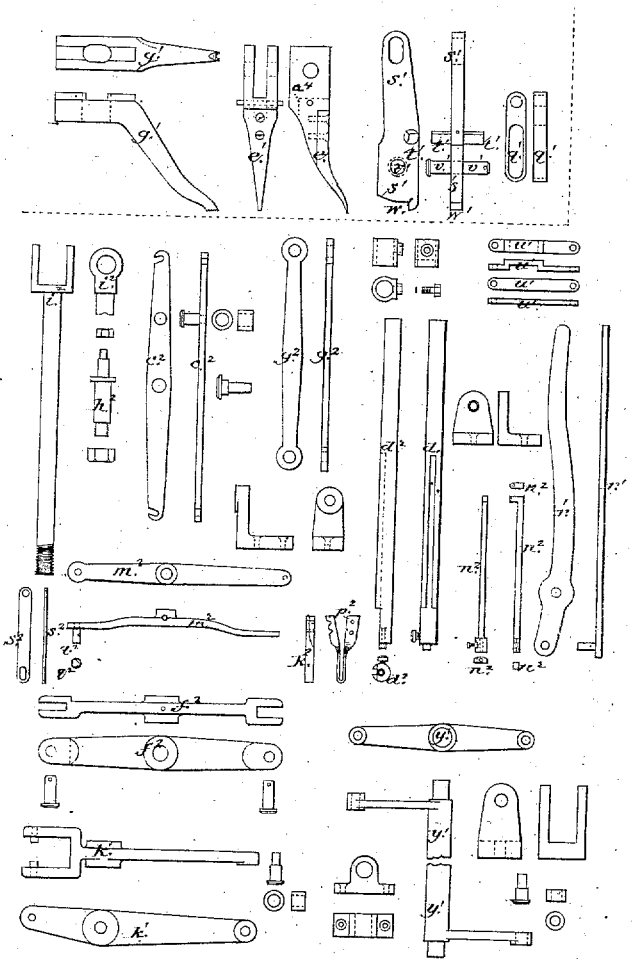
Witnesses:
A. A. Seaman
Edw. W. Down
Inventors
Gordon McKay
Trustee McKay Sewing Machine Association
Assees Gordon McKay & Robert H. Mathies
per Lemuel Gregory Atty
THE NORRIS PETERS CO., WASHINGTON, D. C.

10 Sheets--Sheet 8.
G. McKAY & R. H. MATHIES.
Sewing-Machine.
No. 6,535. Reissued July 6, 1875.
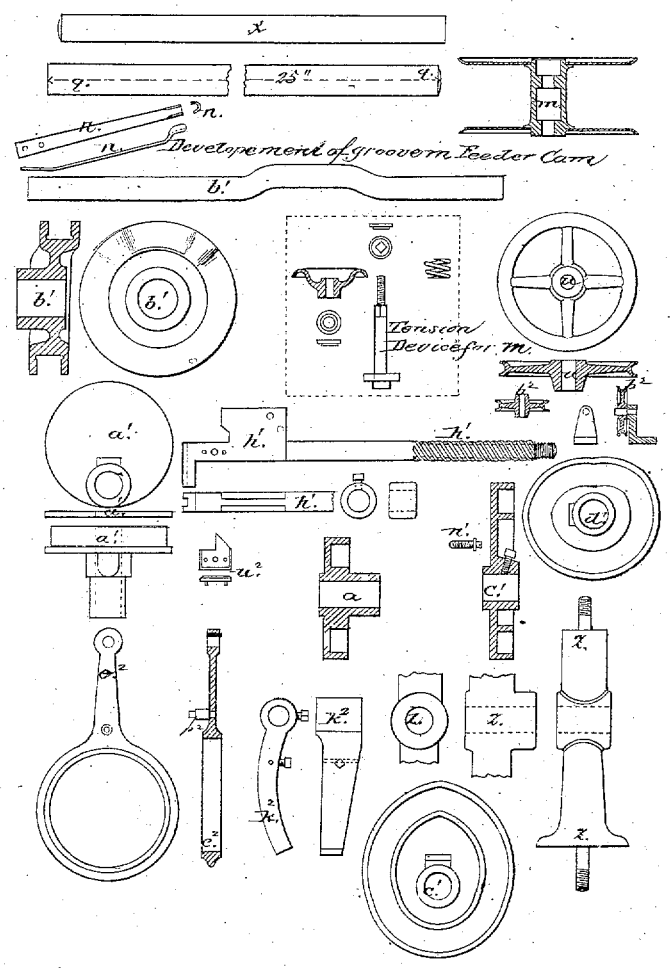
Witnesses:
A. A. Seaman
Edw. H. Dunn
Inventors:
Gordon McKay
Trustee McKay Sewing Machine Association
Assee of Gordon McKay & Robert H. Mathies
per Crosby & Gregory
Attys.
THE NORRIS PETERS CO., WASHINGTON, D. C.

G. McKAY & R. H. MATHIES.
Sewing-Machine.
No. 6,535. Reissued July 6, 1875.
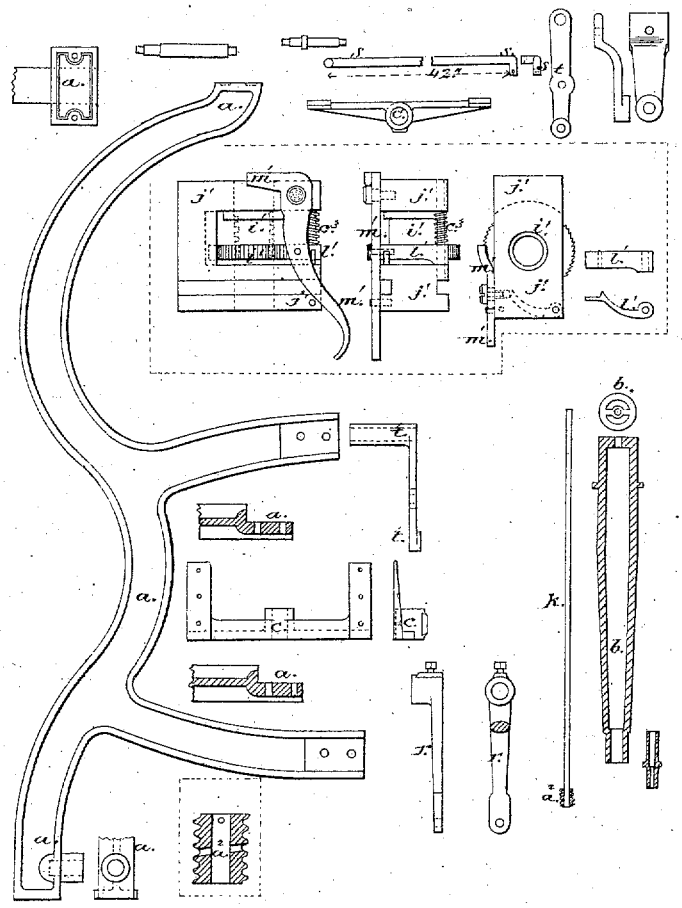
Witnesses:
A. A. Lestman
Edw. H. Donn
Inventors:
Gordon McKay
Trustee McKay Sewing Machine Association
Assees Gordon McKay & Robert H. Mathies
per Lenly Gregory Atty
THE NORRIS PETERS CO., WASHINGTON, D.C.

G. McKAY & R. H. MATHIES.
Sewing-Machine.
No. 6,535. Reissued July 6, 1875.
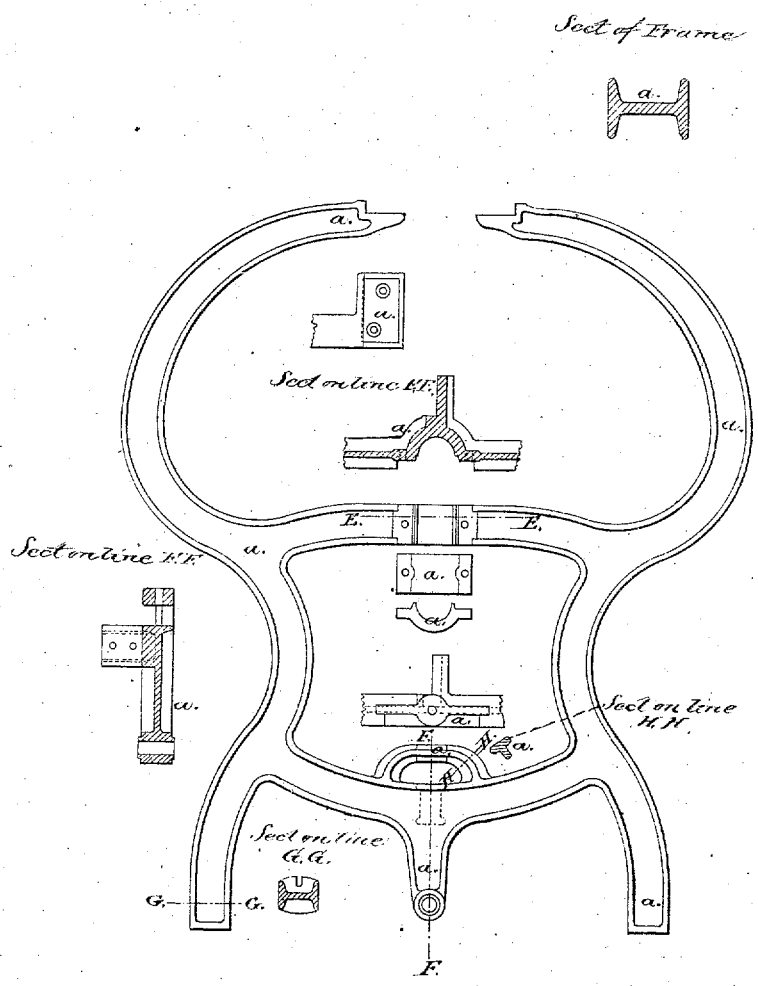
Witnesses:
A. A. Seaman
Edw. W. Down
Inventors
Gordon McKay
Trustee McKay Sewing Machine Association
Assees of Gordon McKay & Robert H. Mathies
per Leroy Gregory Atty
THE NORRIS PETERS CO., WASHINGTON, D. C.

UNITED STATES PATENT OFFICE.

GORDON McKAY, OF CAMBRIDGE, AND ROBERT H. MATHIES, OF BOSTON, MASSACHUSETTS, ASSIGNORS, BY MESNE ASSIGNMENTS, TO GORDON McKAY, TRUSTEE OF THE McKAY SEWING MACHINE ASSOCIATION.

IMPROVEMENT IN SEWING-MACHINES.

Specification forming part of Letters Patent No. 36,163, dated August 12, 1862; reissue No. 6,535, dated July 6, 1875; application filed June 25, 1875.

*To all whom it may concern:*

Be it known that GORDON McKAY, of Cambridge, in the county of Middlesex, and ROBERT H. MATHIES, of Boston, in the county of Suffolk, all in the State of Massachusetts, did invent certain new and useful Improvements in the Sewing Mechanism patented to Lyman R. Blake July 6, 1858; and it is hereby declared that the following, taken in connection with the drawings, which accompany and form part of this specification, is a description of the invention sufficient to enable those skilled in the art to practice it.

This invention comprises improvements upon the mechanism designed by Lyman R. Blake for sewing or attaching the uppers to the soles of boots and shoes, which mechanism was patented to said Blake in the United States, July 6, 1858, and, with some modifications by him, in the United Kingdom of Great Britain and Ireland, the Channel Islands, and Isle of Man, May 3, 1859, the latter of which patents is numbered 1,111, and was sealed June 14, 1859. Some of said improvements are also advantageously applicable to other sewing mechanisms than that mentioned, chiefly to those employed for manufacturing purposes, rather than to family machines, so called.

In Blake's aforesaid English patent the seam was made to conform to curves and angles by turning the feeding instrument and the needle, the horn or support being stationary, as in the American patent referred to. But for various reasons this has been found inconvenient and objectionable to some extent, as, in attaching the soles to boots and shoes, the seam cannot be made to conform sufficiently throughout its whole extent to the curvatures thereof by twisting and turning the work under the needle and upon its bed or support, which is termed the arm or horn.

This invention consists in the combination, with a machine for uniting soles to uppers, of a rotating support or horn, adapted to enter and support the shoe with its sole substantially at right angles to the axis, about which the horn rotates substantially as described, while the upper is being united to the sole; also, in the combination, with a rotating horn adapted to enter and support a shoe while the upper is being united to the sole, of a feeder adapted to engage and move the sole over the rotating horn, substantially as described; also, in the combination of a rotating horn adapted to enter and sustain a boot or shoe, as described, with a presser to hold the sole down on the horn, substantially as described; also, in the combination of a presser and a feeder, with a rotating horn, substantially as described; also, in the combination, with a sewing mechanism, of a rotating projecting horn, and a whirl or looper carried in the end of the horn and adapted to lay its thread into the hook of the needle, substantially as described; also, in the combination, with a rotating projecting horn and a whirl or looper, of a thread spool or bobbin moving with the horn, substantially as described; also, in the combination, with a rotating horn, of a tension device adapted to produce tension on the thread carried by the horn, substantially as described; also, in a rotary whirl or looper combined with a rotating horn and with mechanism adapted to operate the whirl, whereby, while the whirl has an intermittent rotary movement with relation to the needle, the horn can be rotated without changing the relation of the whirl and needle to each other; or, in other words, so that rotation of the horn shall not rotate the whirl, though supported by and held in the horn, and so that rotation of the horn shall not effect the intermittent rotary movement of the whirl.

This invention also consists in making the position of the fulcrum of the lever which operates the needle adjustable by manipulation of the operator, so as to change the amount of the stroke of the needle.

Another part of this invention consists in automatically adjusting the amount of the thread drawn up by the needle to the thickness of the stock, and in automatically varying the amount of the thread so drawn up by the variation in the thickness of the stock at or near the place where the stitch is making, so that more or less thread is drawn up by the needle at each stroke conformably with the thickness of the stock at said place, thick stock requiring more length of thread, and consequently more stroke of the needle, than thin stock. When the stroke of the needle is once automatically adjusted to stock of uniform thickness, it will not thereafter automatically vary therein.

In sewing soles, the thickness around them where the seam passes through is very uneven, caused by the puckering of the upper at the heel and toe, and by lasting in the counter-stiffening; also, by seams in the upper, and by the use of half and tap soles, welts, &c.

The length of thread required to be taken from the spool at each stroke of the needle, to form a chain-stitch, is equal to three times the length of the stitch added to twice the thickness of the stock, with a slight amount added to this sum for length of thread taken up in doubling one loop around the next. If the stroke of the needle does not draw said length of thread from the spool for each stitch, the thread will draw through, or, will, as it is termed, "render" through, the hook of the needle, tending to fray the thread and to cause it to break; and if more than the requisite amount of thread is drawn off from the spool for each stitch, the result is that the stitches cannot be drawn up tightly, and the work will be loose, or not well closed together.

Another part of this invention consists in automatically lifting the presser foot from the stock, no matter what its thickness relatively to the surface of the stock, and not as heretofore practiced relatively to the surface or bed on which the stock is supported. This lifting of the presser-foot has two functions—one to prevent the thread from being clamped or bound between the top of the horn and the lower surface of the stock, so that the stitches may be drawn tight without imparting to the thread a breaking-strain; and the other to let the stock be lifted sufficiently before the forward or feeding action of the feeder takes place, so that the stock which may have been embedded on the horn by the pressure of the presser and the puncturing action of the needle may clear the horn and offer no impediment to the feeding action, and so that stock of increasing thickness may be fed forward under the presser without binding. The lift which is given to free the thread may be made enough to clear the stock from contact with the horn in feeding, or separate lifts can be given to the presser by the cam which operates it, for each of the purposes named.

This part of this invention comprises also a method of varying the amount of the lift which is given to the presser-foot by the constant throw of the cam, all of which throw may be rendered effective or not in the lift of the presser-foot. This adjustability of the lift of the presser-foot is desirable, because where the stock is compressible more lift is needed than where it is hard and unyielding.

This invention also consists in transmitting to the presser the resistance to the upward movement of the needle, so that, as the strain upon the needle increases in drawing up the thread and in tightening the stitch, tending to draw the stock from the horn toward the needle, this tendency is opposed by the increasing resistance of the presser. The resistance of all other pressers which have a movement toward and from the support of the stock is obtained by springs or by weights, so that when the limit of the resistance of said springs or weights is exceeded by the upward pull of the needle, the presser yields and the stock is pulled toward the needle, which movement prevents tightening of the stitches. In some sewing-mechanisms, to obtain a solid resistance to the pull of the needle upon the thread, the needle has been made to operate from beneath the stock-support, so as to pull against said support in tightening the stitches, but, as with the horn employed for the purpose of sewing soles, it is manifest that the organization of the sewing mechanism cannot be thus reversed, we have combined the needle and presser, to act as aforesaid.

This invention also consists in so arranging and combining, with the needle, the slide that operates to cover and uncover the eye or hook thereof that each shall move together without varying their positions relative to each other throughout the greater part of the stroke, except at or near the termination of the upstroke, when the slide has an increased velocity and range of motion imparted to it to uncover the eye or hook of the needle before the commencement of its downstroke, and except, also, at or near the termination of the downstroke, when increased range and velocity of movement are given to the parts through which the slide is operated, by which the hook of the needle, when emerging from the stock, is covered throughout all of the upstroke except the terminal portion thereof. This part of this invention comprises, also, such a combination of the slide with the needle as to make the stroke of the former automatically correspond with the stroke of the latter in its changes, the stroke of the slide increasing and diminishing as the stroke of the needle is increased or diminished, and without any attention or manipulation on the part of the operator.

This invention also consists in the arrangement and combination of the feeder and presser (when these instruments are separate from each other in their functions and times of movement) directly in front of, and in proximity to, the hook of the needle, in the plane in which the feeder vibrates, and above the stock to be sewed, so as to operate on the upper surface thereof. This part of the invention also comprises such an arrangement and manner of combination of the separate feeder and presser that the length or effective amount of the feeding movement of the feeder shall be dependent upon and shall be controlled by the distance from the needle at which the presser is set, this instrument being made adjustable in the plane of the vibrations of the feeder, for the purpose of regulating the feed or the length of the stitches made by the mechanism.

And this invention also consists in various parts, and in combinations and arrangements of parts, substantially such as are herein described, whereby the operation of uniting soles to uppers of boots and shoes is facilitated.

Of the drawings there are ten sheets. Sheet 1 represents, in perspective, a machine embodying this invention. The other sheets exhibit, in plan, section, and elevation, working drawings of a machine embodying this invention, and including also sundry modifications or changes of parts, similar letters referring to similar parts in all the sheets. Sheet 2 shows in front elevation a machine arranged to be put in motion by power. Sheet 3 shows a side elevation of the same; and Sheet 4 a plan of the head of the machine, the top plate, which is shown in dotted lines, being represented as removed, to show parts beneath. Said sheet also shows a section through the head, showing the main or cam shaft, and the parts thereon.

The balance of the sheets are filled with the details of the machine, except Sheet 5, which shows certain modifications not elsewhere detailed, and certain diagrams of motion to be hereafter alluded to.

The instruments which are immediately operative in conjunction with the horn in forming a seam are the needle, the slide, the feeder, the presser, and the whirl, and their movements with relation to each other are very nearly as follows: All of these instruments, being operated from the rotation of the cam-shaft, may have their times of movement, and the relation of the movement of the instruments to each other, referable to some part of the whole rotation of the shaft, and the circle which represents its rotation may, for convenience, be supposed to be divided into twenty equal parts by twenty radial lines, (see Sheet 5,) on No. 20 of which the eccentric is at its upthrow and the needle is at its lowest stroke, and at about No. 10 the eccentric is at its downthrow and the needle at its highest stroke.

The machine illustrated and embodying this invention is adapted to sew stock varying in thickness from three-sixteenths to five-eighths inch, and with stitches varying in length from one to two eighths inch.

When sewing the thickest stock, the needle commences to rise just before line No. 4, and when sewing the thinnest stock just after No. 5. The highest point of stroke is reached at about No. 10, and the end of the downstroke is reached, both with thick and thin stock, at No. 20. The presser lifts to release the thread from pinch, beginning at half-way between Nos. 2 and 3, and ending at No. 5, and rests there at the height to which it is lifted till the needle gets near the top of its stroke, when it again lifts at about No. 10, so as to let the feeder act freely; or, the presser having lifted, as before described, can be raised gradually to the lift required at No. 10 for the operation of the feeder, and in either case the presser drops, or is brought down upon the stock so as to pinch or clamp it to the horn at or before No. 13, where it remains till again lifted at about what would be No. $2\frac{1}{2}$, as described.

The feeder moves forward, or gives its feeding motion, from about Nos. $10\frac{1}{2}$ to $11\frac{1}{2}$, and returns in from Nos. $12\frac{1}{2}$ to $13\frac{1}{2}$, where it remains resting on the presser-foot away from the stock till No. 16, when it is forced downward into the stock, and punctures it ready for the next feed movement, which takes place in parts of the next rotation from Nos. $10\frac{1}{2}$ to $11\frac{1}{2}$, as before stated.

The movement of the looper to throw the thread into the eye of the needle begins at No. 18, and terminates at No. 4, from which it begins its return movement, which is terminated at No. 10. The slide moves with the needle throughout parts of its stroke, covering its hook on the upstroke, and leaving it uncovered on the downstroke, and resting on the surface of the stock, as will be more fully described hereafter.

*a* is the frame-work of the machine, which supports the horn-shaft *b*, the treadle *c*, and the lower plate *d* of the head of the machine. The horn itself is represented by *e*, projecting upward, at any suitable angle, toward the needle *f* from the horizontal arm *g*, which supports the horn and connects it with the shaft *b*, with which it rotates. The horn *e* has a whirl, *h*, constructed as shown in detail on Sheet 6, which is rotated by the bevel-pinion shaft *i*, and this shaft *i* is rotated from the horizontal shaft *j* in the arm *g*, the shaft *j* being rotated by the vertical shaft *k*, which is made to rotate in the center of *b* by a movement communicated from the cam-shaft *x*, by means hereinafter described.

The number of teeth in the bevel-gear on *k*, and in the pinion on *j*, into which said gear meshes, must have the same proportion to each other that the teeth on the whirl have to the teeth of the pinion which meshes into the whirl. The arrangement of gearing, as shown in detail, Sheet 6, holds the whirl still, with relation to the needle, while the horn is rotated with shaft *b*, the axial line of which and of the whirl are in the prolongation of the axial line of the carrier $d^2$, and of the small supporting-surface at the end of the horn, it being understood that the bevel-gears connecting *i* and *j* have the same number of teeth, and simply change the direction of rotation. It will be seen that rotary movement can be given in either direction to the whirl through the shaft *k*, while the horn is moved by the operator in either direction, and that the rotation and the rest or position of the whirl relative to the needle, or any fixed part of the machine, are entirely free from connection with the movement of the horn, though inclosed and supported by the horn. The thread spool or bobbin $m$ is provided with a tension device, detailed on Sheet 8, and is supported on arm $g$, the thread passing over a spring, $n$, Sheet 2, and leader-pulley $o$, into a thread channel formed in the horn, to and through the small side hole $t^2$, formed in the whirl $h$, Sheet 5. The function of the spring $n$ is to yield and give a little thread to the first pull of the needle, so as to cause the bobbin to start with less of a jerk in giving off the amount of thread needed at each stroke of the needle.

At the lower front part of the machine a treadle, $c$, is fixed on a rocker-shaft, $q$, which is supported in suitable bearings in the frame. This treadle, worked by foot, may be made to rotate the cam-shaft $x$, or it may be made, as shown in the drawings, Sheet 3, to operate binder-pulleys $u$, to control the operation of the belt $v$ on the driving-wheel $w$. $r$, Sheet 2, is an arm on rocker-shaft, $q$; $s$, a link from $r$ to rocker-arm $t$, Sheet 3, which is attached to, and vibrates on, the upper rear part of the frame, and which carries the two loose binder-pulleys $u$, one of each of which operates on one part of the belt $v$, which is shown passing over the fly-wheel $w$ on the cam-shaft $x$, the belt being driven from a pulley beneath the floor, not shown. When "power" is not accessible the pulleys $u$ are dispensed with, and a link connects a crank-pin in $w$ with the stud in the vibratory end of $t$, and the machine is then worked by the operator by means of the treadle.

The upper plate $y$ of the head is supported and held from $d$ by suitable posts $z$, in two of which are bearings for the cam-shaft $x$. This shaft has fixed upon it the eccentric $a^1$, which operates the needle, and the cams $b^1$, $c^1$, and $d^1$, which respectively operate the feeder $e^1$, the whirl $h$, and the presser $g^1$. The presser $g^1$ terminates in a slightly-roughened facet, and is so arranged as to be operated by the presser-bar $h^1$, in close proximity to the needle and in front of it, on its hooked side, and in the line of the feeding vibrations of the feeder. The presser $g^1$ is so connected with the presser-bar $h^1$ that it can be adjusted thereon by the operator, nearer to or farther from the needle, so that the inclined surface of the presser nearest the needle shall operate on the feeder in its vibrations, to cause it to feed the stock for short or long stitches, as may be desired. The presser is arranged so that it is lifted from the stock, is let fall thereon, is pressed thereupon, and is kept from rising relatively to the fulcrum of the needle-lever, all at the proper times, as described hereafter.

Referring to Sheet 1 for one of the devices or combinations by which the presser is lifted and let fall, and also kept from falling, it will be seen that the presser-bar $h^1$ passes through one end of the lever $k^1$, the opening in said lever being large enough to let it vibrate without coming into contact with $h^1$. The spring $o^1$, acting against $k^1$ and a shoulder of $h^1$, forces $h^1$ downward when free from other controlling forces. The frame-piece $f^1$ surrounds $h^1$, and is connected to $k^1$ by the link $v^2$, so that $f^1$ is raised and lowered by the vibrations of $k^1$. Within the frame $f^1$ are two pieces, $a^3$, pivoted thereto, fitting the presser-bar, but not extending entirely around it. The inner end of the frame projects beyond the pivot by which it is connected to the link $v^2$, so that it will, upon rising with $k^1$, impinge against the screw $n^1$, the operation of which is to swing the frame upon the link against the pull of spring $b^3$, and thus, by bringing the frame more nearly level, allows the pieces $a^3$ to open, releasing $h^1$ from the gripe or hold of the pieces $a^3$, through which gripe or hold the presser is raised.

It will be evident from the arrangement of the parts just described that upward vibration of that end of $k^1$ which is around $h^1$ will, in connection with the action of spring $b^3$, incline the frame-piece $f^1$ and bring the pieces $a^3$ into griping contact with $h^1$, and that, in the regular operation of the machine, the gripe can be sooner or later released by adjusting the position of the screw $n^1$; also, that the operator can let the presser fall upon the stock, when adjusting it, whenever desirable, by lifting the end of $f^1$, which projects at the front of the machine.

It will be evident, with the devices just described relating to the presser, that $g^1$ is lifted from a variable base-line, which is the surface of the stock on which it rests when down; also, that the lift of the presser is constant so long as the screw $n^1$ remains unchanged. Other devices which lift the presser in other sewing mechanisms raise it from a positive base-line to a fixed height, so that where the stock operated upon is thick the effective lift of the presser from the upper surface of the stock is lessened.

Modifications may be employed of the devices just described for lifting the presser from a variable base-line, and for letting it descend upon the surface of the stock, some of which are shown in the drawings, and may be described as follows:

On the upper end of the presser-bar (see Sheets 2 and 8) a very quick screw-thread is cut, fitting a nut, $i^1$, which is held in the piece $j^1$, which piece is made to vibrate by means of the lever $k^1$, worked by the presser-cam $d^1$. The nut $i^1$ has a ratchet-wheel formed on its periphery, upon which the pawl $l^1$, Sheet 9, operates at certain times to prevent the nut from rotating in that direction which would lower the presser foot and bar, the pawl being pivoted to $j^1$. The bent lever $m^1$ is also pivoted to $j^1$, so that, when $j^1$ is raised to a certain fixed height, the short arm of $m^1$ strikes against a screw, $n^1$, which is adjustable in the plate $y$ over the said short arm, and further upward movement of $k^1$ causes $m^1$ to trip the pawl; then the spring $o^1$ forces the presser down upon the stock, rotating the nut $i^1$ in so doing, while the pawl is kept clear from contact with the ratchet-teeth. As $k^1$ afterward moves downward, rotating the nut $i^1$ in the direction opposite to that in which it was rotated by the fall of the presser, or in the direction in which the ratchet-wheel can turn under the pawl, the short arm of $m^1$ is released from contact with $n^1$, and a spring, $c^3$, which acts against the pawl, throws it against the teeth of the ratchet.

It will be seen that the arrangement described and shown of the quick-screw, the ratchet-nut, and the pawl with other parts therewith connected, renders downward motion of the presser impossible, except when the pawl is thrown out of gear with the ratchet by the action of $n^1$, as described, so as to let the presser drop upon the stock, rotating the nut in so doing, or except when the operator pulls the pawl out of gear by operating the long arm of $m^1$, which is fashioned into a handle for that purpose. It will also be seen that the presser rests upon the stock with the pressure of spring $o^1$ directly after the pawl is tripped, and that it remains on the stock, in front of the needle, compressing it till lifted by the cam $d^1$, just as the needle begins to rise; also, that the presser-foot cannot be moved downward, except by throwing the pawl out of gear, unless by turning the cam-shaft backward, which is not contemplated in this specification. It will also be plain that the presser is constantly lifted and let fall upon the stock, so that where the stock, as it is made to move under the presser, varies in thickness, any projection like that shown at $p^1$ on the presser will, when the presser is on the stock, be stationary at various heights from the surface of the bed or horn. This varying position of $p^1$ is made operative in the automatic change of the stroke of the needle, as will be hereinafter explained.

The proportion of the lift of the presser-bar to the pitch of the screw-threads is such that when the presser falls the nut is rotated about one-quarter of a turn. This, when repeated as many times in a minute as the needle makes strokes, is a source of considerable wear, besides which the hammering action of the fall of the presser may be somewhat objectionable. To avoid these objections the modifications connected with the presser-foot (shown in the partial plan and elevation on Sheet 5) may be substituted for the devices before described.

The pawl which works in the teeth of the ratchet-wheel formed on nut $i^1$ is in this case made part of the lever $m^1$; or, rather, $m^1$, in this construction, forms the pawl, which the spring $d^3$ tends to keep constantly in gear with the teeth of the ratchet. The fulcrum-bar $i^2$ is provided with an arm, $e^3$, so arranged and adjusted that its salient end projects so as to act on $m^1$ during the terminal portion of the upward movement of the fulcrum-bar. The effect of this is that the presser is raised and lowered by the positive movement given by the presser-cam $d^1$, instead of being dropped from the height of the whole lift given, as when the last part of the upward movement of the presser-lever $k^1$ operated to liberate the nut from the retaining action of the pawl. The presser, therefore, will tend to be lowered at each stroke to the point from which it was raised, unless stock of increased thicknes has been fed beneath the place where the presser-foot acts, in which case the presser will rest on the stock and the nut will be turned under the lever $m^1$, in that direction permitted by the form of the ratchet-teeth. But if, while the presser has been lifted from the stock, thinner stock has been fed beneath it, the action of the presser-cam will lower the presser to the point from which it started, and then when the pawl is tripped the spring $o^1$ will cause the presser to fall upon the stock, which fall will be just the difference between the thickness of the stock where last and where now rested upon. If the stock is of uniform thickness, the pawl will return against the ratchet-tooth with which it was in contact before being tripped by $e^3$. But if the stock is increased in thickness, the presser will be lowered till it is checked by resting thereupon, and the presser-bar lever continuing to carry down $j$, the nut is thereby turned in the direction permitted by the pawl and ratchet-teeth, and when the pawl is tripped by $e^3$ it will return again into contact with the tooth which it left.

The arm $e^3$ could be used to operate under the front projecting part of $f^1$ in the presser mechanism shown in Sheet 1, in which case the screw $n^1$ would be dispensed with, and the presser would operate without the fall from the full height to which it is raised, as in the case of the manner of operating the screw and nut device just described. The lift of the presser-foot may be considered as divided into two parts, the first of which is to relieve the stock from pinch on the horn, so as to let the thread draw freely between the lower side of the stock and the upper surface of the horn during the rise of the needle. The movement given to the presser-lever $k^1$ is constant, but it is desirable to make the first part of the lift of the presser variable, because a lift that would be sufficient with thin unyielding stock would not suffice where the stock is thick, yielding, and elastic. This provision we have made by giving an excess of motion during the first lift to the presser-lever, and by rendering more or less of the motion operative on the presser according to circumstances. The mechanism we employ to effect this end is shown in Sheets 1 and 5. The presser-lever $k^1$ is pivoted to a fulcrum-bar, $f^3$, which is so arranged that it may have any amount of vertical movement within a limited range, the amount being governed by the nut $g^3$ in Sheet 5, and by the screw $h^3$ in Sheet 1. It will be obvious that if play or movement is permitted to the fulcrum, that amount increased by the leverage is lost to the presser.

By inspection of the drawings referred to, it will be seen that the fulcrum-bar $f^3$ may be rendered immovable by operating $g^3$ or $h^3$ so as to draw the shoulder on $f^3$ against the under side of the plate $y'$. The fulcrum being then immovable, the whole of the throw of the cam $d^1$ will be imparted to the lever $k^1$, and consequently to the presser. The presser-foot can be lifted by hand to place stock under it, or to remove stock from the horn, means for this being shown in the link $q^1$, which is connected to $h^1$, and in the hand-lever $r^1$, as shown in Sheet 2. The feeder is connected with the presser-bar by a link, $s^1$, (see Sheet 7,) which is slotted at its upper end to permit vertical movements. A pin, $t^1$, is fixed in the link $s^1$, and moves in angular grooves formed on the sides of the presser-bar, (the plates $u^2$ contributing to form said grooves,) so that part of the reciprocatory movements of the links $w^1$ cause the feeder $e^1$ and link $s^1$ to rise and fall as well as to move horizontally. The pin $v^1$, by which the links $w^1$ take hold upon the feeder, forms the hinge upon which the feeder swings on the link $s^1$ in drawing up on the front inclined surface of the presser in the backward movement of the feeder, and also in its forward movement until the projection $w'$ on $s^1$ strikes a shoulder, $a^4$, Sheet 7, of the feeder, making a kind of stop-hinge, by which the link $s^1$ and feeder are made rigid in the feeding movement, but capable of bending in the backward movement of the feeder, so that the point of the feeder can be raised on the inclined front of the presser out of the stock. The small spiral spring $x'$ operates to keep the point of the feeder close upon the front inclined surface of the presser, so that the feeder-point shall puncture the stock close to the presser. Said spring also acts to draw the point of the feeder back to its return stroke. The rocker-shaft $y'$ receives motion from the cam $e^1$ through a rocker-arm, and transmits the motion through another rocker-arm to the links $w^1$, which give, through the mechanism described, the proper motions and times of motion to the feeder.

The feeder, being connected with the presser, is raised from the horn with it, as before described, and the length of stitch is regulated by adjusting the distance of the presser from the needle, so that more or less of the reciprocations of the feeder are expended on the inclined surface of the presser. When the links $w^1$ are so moved as to straighten the feeder and the link $s^1$ like a toggle-joint, the point of the feeder is forced into the stock by the action of the side inclines on the pin $t^1$, and further straightening movement is prevented, the action of $w^1$ on the feeder rendering the link $s^1$ and feeder rigid, then the feeder moves forward. The feeder operates best by so adjusting the cam $b^1$ lengthwise of the shaft $x$ that its point comes, on its extreme forward throw, under the axial line of the needle, so that the puncture of the feeder aids the perforation of the stock by the needle in its next stroke. It is well to arrange a retaining-stop to restrain the feeder from being moved by any accident beyond its intended forward terminal point of stroke. Rotation is given to the shaft $k$ by means of a cord, $z^1$, which, after being secured to the screw-formed guide-drum $a^2$ fixed on $k$, and being wound around $a^2$, passes over guide-pulleys $b^2$ to the ends of the lever $c^2$, which is operated by the whirl cam $c^1$. Instead of $a^2$ a pinion may be fixed on $k$, which may be operated from the whirl-cam $c^1$ by suitable rigid connection. The needle is secured in the bar or carrier $d^2$, which is reciprocated from the eccentric $a^1$ by the intervention of the eccentric strap and arm $e^2$, the lever $f^2$, and the link $g^2$. The simple ordinary operation of similar parts is modified by making the fulcrum of the lever movable, and so as to be checked at a fixed point in the upward throw of the eccentric, which gives downward movement to the carrier, and at variable points in the downward throw of the eccentric, which gives upward movement to the carrier. The pin $h^2$, which is the lever-fulcrum, is fixed to the bar $i^2$, which is arranged to slide in bearings in $d$ and $y$. It is plain that when the motion of the carrier is resisted by performing work, the fulcrum, if free to move, will reciprocate instead of the carrier when the eccentric is rotated. If the eccentric is on the upward throw, the point at which the downward stroke of the carrier terminates will depend upon the amount of upward movement allowed to the fulcrum. This is regulated by the adjustable stop $j^2$, which strikes against the under side of plate $d$, preventing further upward movement of the fulcrum, and causing the continued upward throw of the eccentric to be expended in moving the carrier downward. It will be seen that the position of the stop $j^2$ determines the lowest position at which the carrier can arrive, without regard to the whole amount of its stroke. In this mechanism the throw of the eccentric is greater than the greatest movement which it is ever intended to impart to the carrier. It is desirable to vary the movement of the carrier when and as the stock varies in thickness, and to do this automatically in accordance with the thickness of the stock where operated on.

In a chain-stitch sewing mechanism, the length of thread required to form a stitch is equal to the sum of three times the length of the stitch added to twice the thickness of the stock, with a slight amount added to this for length of thread taken up in doubling one loop around the next. From this it will be seen that the amount which the throw of the needle should be varied, to have the thread drawn off by it proportioned to the variations of the thickness of the stock, is double either the increase or the diminution of the thickness of the stock.

As the lever $f^2$ is pivoted in the center, any change in the height where this center or fulcrum becomes fixed will be accompanied with a change twice as great in the movement of the carrier $d^2$. On the bar $i^2$ there is an arm, $k^2$, adjustable on $i^2$, which projects over the shoulder $p^1$, forming part of the presser-bar, and this shoulder acts as a stop to check downward movement of the fulcrum. The higher the shoulder $p^1$ is placed the less will be the lost movement of the carrier; or, in other words, the eccentric end of the lever $f^2$ moving constantly would impart its movement to the carrier if the fulcrum did not move, and the sooner the movement of the fulcrum is stopped the greater will be the movement imparted to the upward stroke of the carrier. It will now be seen that the position of $p^1$ is set by the thickness of the stock on which the presser rests at each stroke of the carrier. The thickness of the stock operates, through the mechanism described, to change the throw of the carrier automatically. As the needle, at each upward stroke, pulls from the spool enough thread to make the next stitch to be made, and as the presser operates on the stock about the distance of one stitch ahead of the needle, it will appear that the presser, in resting upon the stock, makes provision to correctly adjust the length of the thread for the stitch passing through the stock at the place where the presser then rests.

The length of the feed, and consequently the length of the stitches, is uniform, but when changed by adjustment of the presser, as before described, the amount of upward movement of the needle must be varied to the amount of three times the change in the length of the stitch. This is done by manipulation of the operator, who moves the arm $k^2$ downward on the fulcrum-bar $i^2$ when the stitch is lengthened, or moves it up when shortened to the amount requisite. When the stroke of the needle is so adjusted as to take from the spool at each upstroke the amount of thread before named as requisite to the formation of a chain-stitch, there will be no slipping of the thread in or through the hook or eye of the needle or "rendering," as it is termed. Rendering through the needle frays the thread and causes it to break, and breakage from this cause is avoided by correctly adjusting the arm $k^2$ to the length of the stitches, and by the automatic variation of the stroke corresponding with the requirements of the varying thicknesses of the material. The spiral spring $l^2$ operates to balance the weight of the vibratory parts connected with the needle.

As the motions of the presser, and the reasons for said motions, and the causes thereof, and the connection between the movement of the needle and the presser-bar, have all been explained, reference may now be had to the diagrams on Sheet 5.

Examination of the solid lines of the diagrams marked "needle" and "presser-foot" will show on the division-line No. 11 the sudden fall of the presser and needle, which is caused by the action of the screw $n^1$ on the apparatus which detaches the presser. The dotted lines, in both diagrams referred to, included between lines Nos. 11 and 13, show the modified descending movements of both needle and presser consequent upon lowering the presser by the movement of the cam $d^1$ and then withdrawing the pawl from the ratchet-teeth, instead of tripping the pawl when the presser is elevated and allowing it to fall on the stock. The dotted lines in said diagrams preceding division No. 11 represent the merging of the first lift of the presser into the second lift, and the effect of this upon the movement of the needle, and it will now appear, as a consequence of the support of the fulcrum of the needle-lever on the presser-bar, that the movement of the needle is modified by the action of the presser-cam. The diagram marked "whirl" shows the whirl $h$ in its position of rest, with the small thread-hole $t^2$ on the division-line No. 18. The amount and direction of rotation of the whirl are shown by the arrow and by the dotted position of $t^2$, which is on division-line No. 4, the inside set of figures indicating the time of rotation of the whirl when laying the thread into the hook of the needle, and the outside set the time in which the whirl returns to its place of starting and of rest. In the diagram marked "feeder," $e^1$ is represented as upon the front inclined surface of the presser, where it remains from division No. 13½ to No. 16, when it slides forward on the said incline, and downward, puncturing the stock, which puncture is complete at No. 17, where it rests till No. 10½, when it moves toward the axial line of the needle, feeding the stock in the direction of the lower arrow, the feed being accomplished at No. 11½. The feeder rests here from No. 11½ to No. 12½, so as to let the presser come down upon the stock to confine it in position on the horn, which, when effected, the feeder draws back to its position of rest on the incline of the presser-foot, which it reaches at No. 13½. In this sewing mechanism, as in all others using the hook or crochet needle, it is necessary, in order to form a seam, to prevent the previously-formed loop from catching in the hook of the needle, as this draws up the next loop. This is effected by a slide, $p$, which covers the hook as it emerges from the stock, the slide resting on the surface of the stock while the needle passes through it to receive the thread beneath. The slide is a short tube or nipple, surrounding the needle, inserted in a stem or rod, $n^2$, and operated by a lever, $m^2$, which is pivoted to the movable fulcrum $h^2$. The stem $n^2$ of the slide is connected to a link, $o^2$, in the manner shown, by the interposition of a spring, $l$, so that the slide will rest on the surface of the thinnest stock when the needle perforates it, slightly compressing spring $l$, or on the surface of the thickest stock, in which latter case the spring $l$ is compressed to a greater degree, while the lever $m^2$ vibrates with the needle-lever $f^2$.

On the eccentric end of the needle-lever a spring, $p^2$, is fixed, which has two retaining-notches, into one or other of which the detent-pin $q^2$, carried by $m^2$, catches, when $m^2$ is moved relatively to $f^2$, said pin being always in one or the other of said notches, and causing $m^2$ to vibrate with $f^2$. (See Sheets 1, 4, and 7.) It is plain that $m^2$, being hung on the same fulcrum with $f^2$, with one end connected thereto by $p^2$ and $q^2$, must, with its other end, move the slide as much as the needle is moved, but as this movement alone would always keep the eye of the needle, when out of the stock, either open or closed, according as the parts were first adjusted, it is necessary to apply a means for moving the lever $m^2$ relatively to $f^2$, to cover and uncover the hook or eye of the needle. This is done by connecting the detent-pin $q^2$ with a pin, $r^2$, in $e^2$, by a link, $s^2$, which is slotted, so that $r^2$ can have some movement in the slot without moving $m^2$. As the eccentric rotates, giving its upward throw, the pin $r^2$ moves in the slot of the link till it strikes the upper end of the slot, and as, in the continued rotation of the eccentric, the distance between pins $q^2$ and $r^2$ would be decreased, the detent is pushed out of the lowest notch in the spring $p^2$ into the upper notch, which moves $m^2$ relatively to $f^2$, and moves the slide on the needle to cover the hook, and this closing movement is effected about as the eccentric passes the upper center, so that the needle is about at its lowest throw. Continued rotation of the eccentric toward the lower center raises the needle and slide without changing their relative relation till, as the distance between $q^2$ and $r^2$ is increased on the approach of the eccentric to the lower center $r^2$, moves in the slot in $e^2$ till it strikes the lower end of the slot, and said distance still tending to increase with the continued rotation of the eccentric, the detent is shifted from the upper notch of the spring $p^2$, changing the relation of $m^2$ and $f^2$, and opening the needle-eye before the needle begins to descend.

The whirl in the salient end of the horn, which is entered by the needle at each stroke, and which carries the thread into the hook of the needle, requires to be peculiarly made to withstand the severe wear brought upon it, and so that it may be easily removed and replaced by another when worn out.

The detail of the construction of the whirl and of the end of the horn in which it is operated, is shown in details on Sheet 6, where it will be seen that the whirl is made of two parts. The inner or central part is often struck by the needle, which is made at least as hard as spring-temper, the striking being caused by glancing of the needle when it touches a peg used in lasting, or an imperfection in the leather, and this impingement of the needle would soon wear the central hole so large as to render the whirl inoperative by the junction of the central hole and the small thread-hole $t^2$. To prevent this the inner portion of the whirl is made of steel, and hardened so that impingement of the needle cannot affect it. But if the whirl were made whole the teeth by which it is rotated would also have to be made hard, or else the whole whirl would have to be made soft.

By making the whirl in two parts, as described, it will be seen that the inner part may be made very hard, while the teeth on the outer part may be left soft, or else hardened to a less degree than the inside part. When both parts of the whirl are tempered to the degree requisite they are united.

As the top of the horn is also liable to be cut and worn by the needle, especially when breakage occurs, this is hardened very hard.

Inspection of the details referred to will show that the whirl is movable when the hardened top piece $i^3$ of the horn is removed; also, that the whirl is supported on the ends of its teeth, and that it is steadied or guided in its rotation by its contour fitting in the cavity in which it operates.

The flaring form given to the central hole in the whirl serves to deflect the needle toward the center when striking the hardened surface of the whirl.

This machine, when made to move without the introduction of stock and the employment of thread, does not operate in all of its parts as it does when employed in sewing. When employed in uniting soles to uppers the operation of the machine is as follows: When the needle is elevated considerably above the horn, but on the downstroke, and premising that the thread is properly drawn through the small hole in the whirl to the upper surface of the horn, leaving an end of a few inches in length, which is pulled toward the left hand of the operator as he stands facing the machine, the feeder and presser are raised by operating $r^1$, and the stock or the boot or shoe is placed on the horn, so that the needle comes over the spot where it is desired to commence to unite the sole and upper. By operating the lever $m^1$ the feeder and presser are lowered, the latter holding the stock on the horn. Rotation being then given to the driving-wheel $w$ in the direction indicated by the arrows, (see Sheet 2,) the needle approaches the stock, and the feeder, moving down the incline of the presser, punctures the stock.

The needle continues to move downward, going through the stock, but the slide $p$ is checked, and rests on the surface, the continued movement of the lever, which operates the slide, being expended in compressing the spring $l$. As the needle arrives at its lowest point of stroke, the whirl is operated, and makes about two-thirds of a rotation around the needle, winding the thread into the hook, and when the needle ascends a little the whirl rotates back to its first position.

Just about as the needle completes its down-stroke, the lever $m^2$ receives an additional motion, by means before described, which, as the slide $p$ is resting on the surface of the stock, is expended in compressing spring $l$; but this motion of $m^2$ has its effect made manifest by the slide covering the hook of the needle as this emerges from the stock in the upstroke.

Continued rotation now brings the end of $k^2$, projecting from $i^2$, upon the shoulder $p^1$, connected with the presser-bar, the needle remaining down till this occurs, being held by the resistance offered by the thread and friction of the needle in the stock; but when said end and shoulder meet, then the needle rises, and near the top of the needle-stroke the slide receives its additional and accelerated movement, which uncovers the eye of the needle. But as the needle begins to rise the presser and feeder are both lifted a little to free the thread from pinch; and now just before the needle descends, and before the feeder moves forward, an additional rise is given to the presser and feeder, and the latter moves to push the work along so that the stock may receive the next perforation of the needle in the proper place, the distance of one stitch from the last perforation. When this feed movement is effected the feeder and presser are both dropped, and as the needle descends the feeder retreats from beneath it, leaving the presser resting on the stock, to hold it in position while the needle is approaching the stock, and while the feeder is rising upon the incline of the presser-foot.

The needle, continuing to approach, again penetrates the stock, and, receiving the thread, as before described, draws a new loop of it through the previously-formed loop, tightens this, and takes enough thread from the spool to form the next stitch.

In working entirely around a sole of a boot or shoe, the uniting of the sole and upper may be commenced anywhere, though it is, perhaps, preferable to begin under the heel, or else on one side of, and at about the middle of, the shank. Assuming, for illustration, that the stock is so placed on the horn as to begin the seam on one side of the middle of the shank, with the point of the horn directly toward the toe of the stock, the seam progresses by feeding the stock along the horn, making the toe of the stock approach the point of the horn, the operator directing and holding, and perhaps slightly twisting it thereon, to accommodate slight curvatures, till arriving at the toe, where, in order to sew completely around it, the horn is given by the operator a complete half-turn, when across and around the toe the seam proceeds along the side of the stock opposite to that on which it is commenced, the feed then operating to draw the toe of the stock from the point of the horn, the point being directed toward the toe, and not having been changed since the start. But as soon as the shoe has been fed in this direction so far that the counter strikes the upper inclined surface of the horn, which will generally be when the point of the horn is under some part of the shank, then a relative change of the position of the stock and horn is made, that was patented to Gordon McKay, herein named, May 6, 1862, in the patent numbered 35,165, the horn being turned while the stock is kept from turning, so that the point of the horn is directed toward the heel of the stock instead of toward the toe, as when the seam was first started, and as it was continued till this said relative change was made.

The relative change of position between the stock and the horn being now made, which can be effected by an expert operator without stopping the working of the machine, the seam is formed around the heel to join its beginning in the shank, which is done with a half turn of the horn with the stock upon it. When the horn and stock are turned together, the movement is made quick or slow, according as the curve or angle is sharp or extended, and according to the speed with which the sewing mechanism is operated. When the relative change referred to is made with a rotating needle and feeder, operating in conjunction with a stationary horn, the sewing has to be stopped, and the needle and parts therewith connected are turned a half revolution, and the stock is also turned on the horn, so that its point is directed toward the heel instead of toward the toe, or vice versa, according as the seam was first started. If the seam is commenced anywhere else except at about the middle of either side of the shank, the relative change in the position of the horn and stock to each other has to be twice made in forming a seam completely around a sole, or to completely attach the sole to the upper.

I do not claim making the stroke of the closing slide of the needle automatically variable or adjustable by the introduction of a spring between said slide and the part which moves it, for the purpose of making the slide conform to the various thicknesses of stock presented to be sewed, for a spring operating in conjunction with a crochet-hook closing-slide, is found in the French patent issued to Messrs. Thimmonier and Ferrand in 1830, and also in several other patents since that date.

What is claimed as the improvement in this invention is—

1. In a machine for uniting soles to uppers, a rotating horn provided with a supporting-surface substantially in line with the axis of the horn, and adapted to enter and support a shoe with its sole substantially at right angles to the axis about which the horn rotates, substantially as described.

2. The combination, with a rotating horn adapted to enter and support a shoe while the upper is being united to the sole, of a feeder adapted to engage and move the sole over the rotating horn, substantially as described.

3. The combination of a rotating horn adapted to enter and sustain a boot or shoe, as described, with a presser to hold the sole down on the horn, substantially as described.

4. The combination of a presser and a feeder with a rotating horn, substantially as described.

5. The combination, with a sewing mechanism, of a rotating projecting horn and a whirl or looper carried in the end of the horn, and adapted to lay its thread into the hook of the needle, substantially as described.

6. The combination, with a rotating projecting horn and a whirl or looper, of a thread spool or bobbin, adapted to move with the horn, substantially as described.

7. The combination, with a rotating horn, of a tension device adapted to produce tension on the thread carried by the horn, substantially as described.

8. A rotary whirl or looper combined with a rotating horn and with mechanism adapted to operate the whirl, whereby, while the whirl has an intermittent rotary movement with relation to the needle, the horn can be rotated without changing the relation of the whirl and needle to each other—or, in other words, so that rotation of the horn shall not rotate the whirl, though supported by and held in the horn, and so that rotation of the horn shall not effect the intermittent rotary movement of the whirl.

9. The combination of the needle-carrier and its operating-lever with a movable fulcrum for the lever, adapted to move for the purpose of changing the throw of the carrier, substantially as set forth.

10. The means described for varying the stroke of the needle to conform to change in the length of the stitch, the same consisting of a stop made adjustable on the fulcrum-bar to vary the distance between said stop and the fulcrum.

11. The combination, with a presser-foot, of a needle and needle-carrier automatically adjustable as to its stroke, substantially as described, to regulate the amount of the thread drawn from the spool by the needle, whereby the amount of thread so drawn is made to conform to varying thickness of stock at or near the point where the needle and presser operate, substantially as set forth.

12. The combination of a horn adapted to support a shoe or boot with an instrument acting on the upper surface of the shoe, calipering the thickness of the stock between such instrument and the surface of the horn, and adapted to regulate, automatically, the length of material used for uniting the upper and sole, and the length of the stroke of the carrier, that while one terminus of it is at a fixed point in relation to the horn, the other terminus shall automatically change in accordance with the variations in the thickness of the material to be united, substantially as described.

13. The combination, with the presser-foot, of a mechanism adapted to lift it a fixed amount from the surface of the stock, no matter what its thickness, substantially as described.

14. The presser-foot, combined with the needle and connected mechanism, whereby the resistance offered to the upward movement of the needle reacts upon the presser to prevent it from being forced upward by the upward strain upon the stock, the presser being prevented from downward motion, substantially as described.

15. The presser and its operating-lever, combined with a movable and adjustable fulcrum, whereby more or less lift can be given the presser by the positive movement imparted by a cam or other equivalent motor, substantially as set forth.

16. The combination of the closing-slide of the needle with the needle and with the mechanism shown and described for operating the closing-slide, and adapted to increase or diminish, automatically, the stroke of the slide, as the stroke of the needle is increased or diminished.

17. The closing-slide of the needle, combined with the needle substantially by the means described, or by their equivalents, adapted to operate the slide to cover the eye or hook of the needle while emerging from the stock, and to move with the needle, keeping its eye or hook covered until at or near the termination of the upward stroke of the needle, when the slide moves relatively to the needle, uncovering its eye, and then, by moving downward with the needle, keeps its eye uncovered until the needle punctures the stock.

18. The combination and arrangement of the separate instruments, the needle, the presser, and feeder in line, substantially as described, and in the plane of the feeding vibrations of the feeder and above the stock to be sewed, whereby they are adapted to operate on the upper surface thereof, said plane passing through the axial line of the needle, as and for the purpose described.

19. The combination, with the presser and feeder, of an inclined surface, variable in height with the presser, substantially as described.

20. The combination of the feeder, the horizontally-adjustable presser-foot and its bar, links $s^1$, provided with projections $w'$, and an inclined surface variable in position with the presser-bar, and adapted to operate substantially as set forth.

21. The combination and arrangement of the spring $l^2$ with the parts connected with the needle-lever, whereby the weight of said parts is counterbalanced to retain the needle at its upstroke until the cheek $j^2$ operates on the plate $d$.

22. The combination of the presser-foot and feeder, adapted to operate in the channel of the sole to guide the line of stitching in conformity with the channel, substantially as described.

23. In a machine for uniting soles to uppers, a rotating horn, constructed substantially as shown and described, and positioned with reference to, and combined with, the operating head of the machine, substantially as shown, whereby the horn always presents its supporting-surface at the point where the sole and upper are being united.

In testimony whereof I have signed my name to this specification in the presence of two subscribing witnesses.

GORDON McKAY,

*Trustee of the McKay Sewing Machine Association.*

Witnesses:

G. W. GREGORY,

S. B. KIDDER.